May 5, 1925.

J. C. NICHOLS 1,536,622

HOOK COUPLING FOR HARNESS

Filed May 22, 1923

Inventor
John C. Nichols

May 5, 1925.
J. C. NICHOLS
1,536,622
HOOK COUPLING FOR HARNESS
Filed May 22, 1923
2 Sheets-Sheet 2
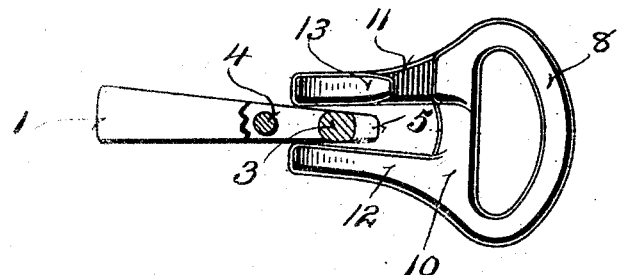
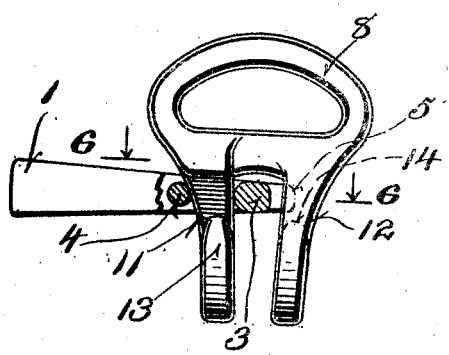
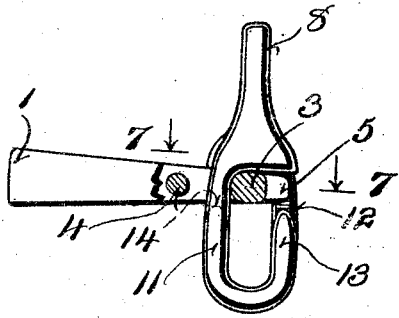
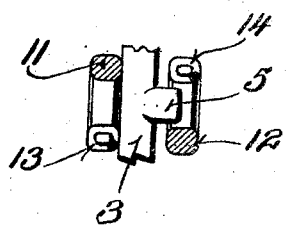
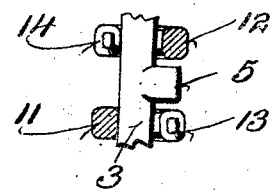
Inventor
John C. Nichols Patented May 5, 1925.

1,536,622

UNITED STATES PATENT OFFICE.

JOHN C. NICHOLS, OF SHEBOYGAN, WISCONSIN.

HOOK COUPLING FOR HARNESS.

Application filed May 22, 1923. Serial No. 640,686.

*To all whom it may concern:*

Be it known that I, JOHN C. NICHOLS, a citizen of the United States, and resident of Sheboygan, in the county of Sheboygan and State of Wisconsin, have invented certain new and useful Improvements in Hook Couplings for Harness; and I do hereby declare that the following is a full, clear, and exact description thereof.

This invention relates to hook couplings for harness and is particularly directed to a twin reverse hook coupling.

This case constitutes one of a series of cases filed simultaneously having elements cooperating to form a harness without stitching.

In hook couplings for harness, as heretofore constructed, difficulty has been experienced due to the breaking of the spring tongue of the snap hook, for instance, and due to the freezing of the tongue to adjacent portions of the hook in extreme weather conditions with resulting difficulty in loosening the tongue.

This invention is designed to overcome the above noted defects, and objects of such invention are to provide a twin hook coupling so organized that no resilient members are required in its construction, which will not freeze or become adherent to the other element of the coupling and which is formed of two main elements each of which, throughout its entire construction, is of integral formation.

Further objects are to provide a unitary hook construction which may be easily locked with the cooperating element, which is securely retained in position even when the straps to which the members are attached become slack and which, although securely locked against inadvertent detachment, may most readily be manually detached when desired.

Further objects are to provide a twin-hook reversed coupling which may be readily produced, which may be sold at a small cost, and which is of simple construction, of sturdy design and light weight.

An embodiment of the invention is shown in the accompanying drawings, in which:

Figure 3 is a partial sectional view showing the first position the parts occupy when detachably interlocking them.

Figure 4 is a corresponding view showing the second position taken by the parts.

Figure 5 is a view illustrating the third position taken by the parts.

Figure 6 is a sectional view on the line 6—6 of Figure 4.

Figure 7 is a sectional view on the line 7—7 of Figure 5.

Figure 1:
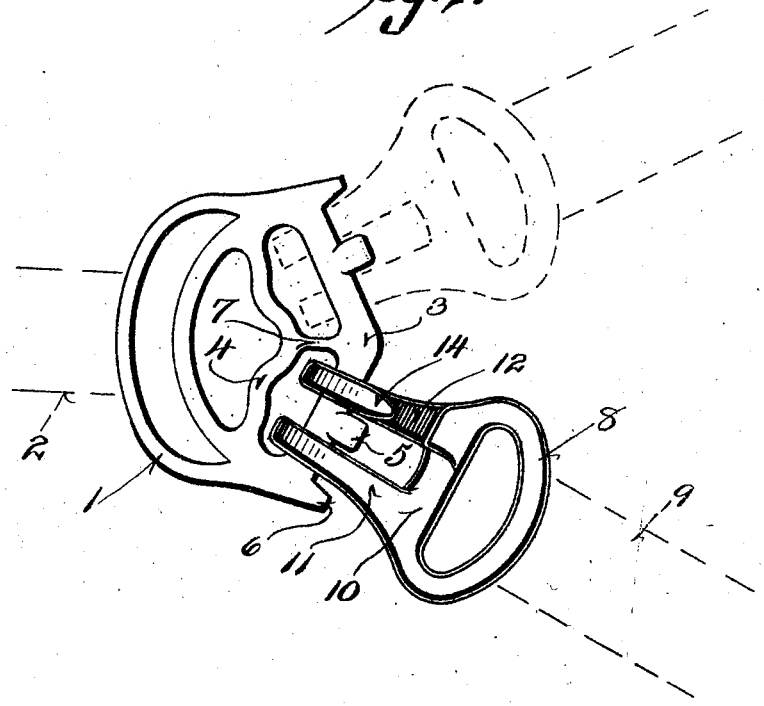
Figure 1 is a face view of the coupling with the parts in interlocking engagement.
Figure 2:
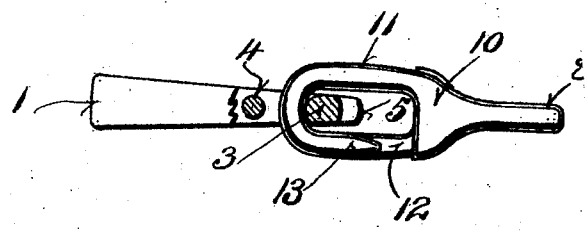
Figure 2 is a fragmentary sectional view of the structure shown in Figure 1.

This harness coupling unit is adapted to be employed at a number of places upon the harness as, for instance, the martingale. In the form shown in Figure 1 of the drawings, the device is illustrated as adapted for joining parts of the martingale. It is, however, to be distinctly understood that the device is adapted for use at numerous other places upon the harness and that the member to which the hook is attached may be either single or double as desired—the double member showing in Figure 1.

The hook receiving member comprises an eyelet portion 1 adapted to receive a strap 2. It has a transverse bar 3 with which the hook is interlocked. At a point spaced from the transverse bar 3, a second transverse bar 4 is provided for a purpose hereinafter to appear. In the form shown in Figure 1 the construction of transverse bars 3 and 4 are doubled. However, the description of one will, of course, suffice for a clear understanding of the invention.

The transverse bar 3 is provided with an outwardly projecting knob or ear 5 approximately centrally located thereon and the end of the bar 3 is provided with a projecting ear 6. In the case of a single transverse bar obviously a projecting ear 6 may be formed upon the other end of the bar also. However, in the double form, the apparatus is provided with a partition or strut 7 to limit the lateral motion of the hook upon the transverse bar 3. In the case of a single bar obviously the additional ear corresponding to the ear 6 would serve a similar purpose.

The hook comprises an eyelet portion 8 adapted to receive a strap 9 and is provided with an enlarged base or body portion 10. From opposite marginal portions of this body portion or base 10 arms 11 and 12 project and are arranged in a substantially parallel relation, as may be seen from Figure 1. The arms 11 and 12 are respectively provided with reversely directed or bent hooks 13 and 14. These hooks lie in the planes of their respective arms as may be clearly seen from the drawings.

In interlocking the device, the hook is turned at right angles to its normal position and the transverse bar 3 is slipped between the arms 11 and 12, as shown in Figure 3. Thereafter, the hook is rotated until it resumes a vertical position with the arm 11 located between the bars 3 and 4 as shown in Figure 4. During a portion of this motion the knob 5 is temporarily positioned between the hook 14 and the corresponding arm 12. The projection 5 thus enters the space between the hook and the arm 12 in the initial rocking motion of one of the parts relative to the other and if it is not so positioned such rocking motion cannot occur at this stage in the attaching or detaching operation, consequently the projection 5 is a further guard or protection against inadvertent detachment of the parts. A plan view of the parts in this position is shown in Figure 6, and it will be seen from Figures 4 and 6 that the top or free end of the hook 14 is below the bottom line of the transverse bar 3. The hook is now rotated about a vertical center line into the position shown in Figure 5—the plan view of the parts being illustrated by the sectional view of Figure 7. The hook is now drawn upwardly and rocked into the position shown in Figure 1 thus securely interlocking the elements. Obviously in uncoupling the device the reverse operations are performed.

It will thus be seen that when the parts are interlocked, as described, that a secure engagement is maintained between the elements, and that, although slack may occur in the attached straps, the hook will, nevertheless, be securely retained in engagement, for unless turning motions are successively performed at right angles to each other, the initiation of the detaching operation will not occur.

It will be seen, therefore, that an extremely simple and sturdy type of unitary reverse twin hook coupling has been provided in which there are no spring elements, in which the parts of the two main elements are integral throughout, and in which freezing cannot occur as is the case with snap hooks.

It will further be seen that the hook is securely retained in position against inadvertent detaching, but may be most readily detached when manually manipulated in a predetermined manner.

Although a specific form of the invention and one application thereof have been described in considerable detail, it is to be understood that the invention may be variously embodied and application thereof varied. It is, therefore, to be understood that the invention is to be limited only as defined by the appended claims.

I claim:

1. A detachable coupling for harness comprising two main elements, one of said elements having a strap receiving portion, an outer transverse bar, and an inner transverse bar; and the other of said elements having a strap receiving portion having a base, a pair of roughly parallel arms extending from opposite sides of said base, and inwardly directed prongs carried by the end of said arms and located upon opposite sides thereof.

2. A detachable coupling for harness comprising two main elements, one of said elements having a strap receiving portion and a transverse bar provided with a projection, and the other of said elements having a strap receiving portion, a pair of substantially parallel arms extending therefrom and terminating in reversely curved hooks, said hooks adapted to engage said bar with the projection between said arms.

3. A detachable coupling for harness comprising two main elements, one of said elements having a strap receiving portion, a transverse bar located adjacent said strap receiving portion, and a second transverse bar spaced outwardly from said first transverse bar, said second transverse bar having a projection extending outwardly therefrom and located approximately centrally thereof, the other of said elements having a strap receiving portion, a pair of substantially parallel arms extending therefrom and terminating in reversely curved hooks, said hooks lying respectively in the planes of said arms, said hooks being adapted to engage the outermost of said bars with the projection carried by such bars located between such hooks.

In testimony that I claim the foregoing I have hereunto set my hand at Milwaukee, in the county of Milwaukee, and State of Wisconsin.

JOHN C. NICHOLS.